(No Model.)
E. BLOSSFELD.
VELOCIPEDE.
No. 363,360. Patented May 24, 1887.
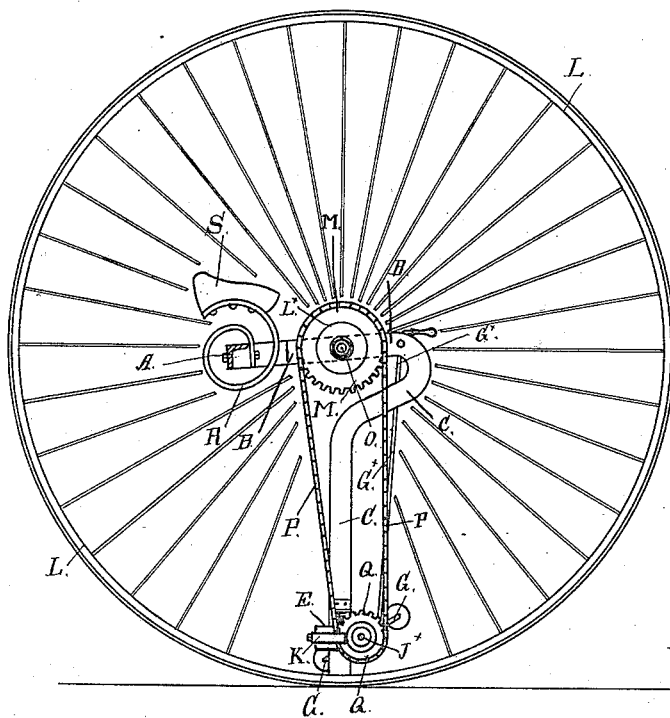
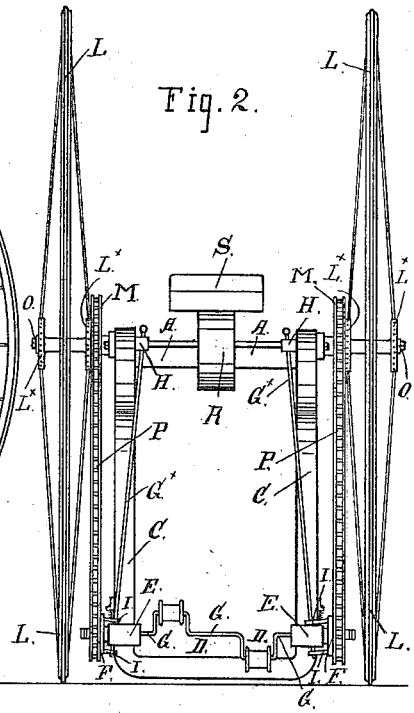
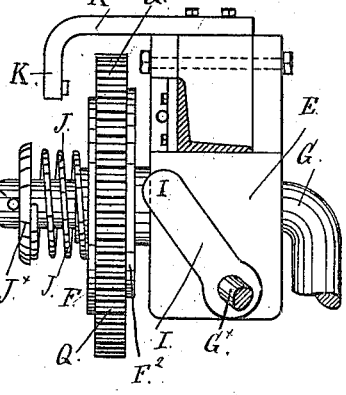
Witnesses:
Wm Mayer
Joseph E. Fa
Inventor:
Emil Blossfeld
C. W. M. Smith
Atty.
By

UNITED STATES PATENT OFFICE.

EMIL BLOSSFELD, OF SAN FRANCISCO, CALIFORNIA.

VELOCIPEDE.

SPECIFICATION forming part of Letters Patent No. 363,360, dated May 24, 1887.

Application filed December 3, 1886. Serial No. 220,624. (No model.)

*To all whom it may concern:*

Be it known that I, EMIL BLOSSFELD, a subject of the Emperor of Germany, residing at San Francisco, in the county of San Francisco and State of California, have invented certain new and useful Improvements in Bicycles, of which the following is a full, clear, and exact description, reference being had to the accompanying drawings.

The object of this invention is to provide a bicycle simple in construction, easy to operate, and one in which the driving-wheels are readily thrown into or out of gear with the propelling mechanism, and the whole machine steered in either direction or turned completely around in a small compass or space.

My invention consists of a bicycle having two wheels of the same diameter rotating upon axles connected to a balanced frame suspended between the two driving-wheels. The suspended and balanced frame carries and supports the treadle mechanism, steering and brake mechanism, and suitable endless chains connected to rag-wheels attached to the driving-wheels, and a cranked axle connected to the lower end of the balanced frame.

The invention also relates to other details of construction and operation.

The nature of the improvements and the manner in which I proceed to construct, combine, apply and use the same are fully set forth and explained in the following description, the drawings being referred to by figures and letters.

Figure 1 is a side view of my bicycle with parts broken off. Fig. 2 is a front view of the same. Fig. 3 is a front view of driving and clutch mechanism with parts in section. Fig. 4 is a plan or top view of clutch mechanism. Fig. 5 is a side view of bearing of the treadle-rod with brake attachment.

Similar letters refer to similar parts throughout the several views.

The frame of my bicycle is constructed, preferably, of one piece of angle-iron, A, bent at right angles to form the nearly-horizontal arms B, then bent downward to form the vertical arms C, which at their lower ends are bent at right angles again and welded together to form a loop, D, within or above which the treadles play. At a suitable distance above the loop formed by the lower end of the vertical arms are bolted the lugs E, which latter project outwardly or forward a sufficient distance to form bearings and supports for the treadle mechanism and steering and brake rods. The ends of the cranked axle G pass through these bearings a sufficient distance to receive the clutch-couplings F, and the clutch-boxes $F^x$ of these couplings turn loosely upon the ends of the crank-axle when engaged by the counterpart boxes $F^2$, the latter being fixed rigidly to the crank-axle, so that when connection is made with the teeth of the clutch-box and the teeth of the counterpart box the whole clutch will rotate together on the cranked axle.

In order to separate or throw the clutches out of gear, the vertical hand-levers $G^x$ are employed. These levers extend down through the lugs H at the end of the right-angled arms of the frame and pass through the lugs or boxings E, and are provided with two toes or lugs, I, keyed or feathered to the levers one above and one below the lugs or boxes E, and are a sufficient distance apart so that when the handles of the levers, or either of them, are turned inward the toes or lugs thereon will engage with the clutch-box and slip it back out of gear with its counterpart box, sufficient room upon the ends of the cranked axle being provided for that purpose.

Helical springs J J are coiled around the outer end of each axle of the crank, and a collar, $J^x$, on the outer face of the clutch-boxes, so that when the pressure is removed from the clutch-boxes they will be forced into gear again by the helical springs. The limit, however, in a backward direction of the clutch-boxes is controlled by curved arms K, connected to the lugs E, the inner faces of which are provided with an elastic packing, which not only limits the backward throw of the clutch-boxes, but imparts a kind of spring or reaction to them when the levers are released.

The driving-wheels L are constructed much in the usual way, yet with a hub of considerable length, upon the outer ends of which are cast the disk or bosses $L^x$, each disk receiving the ends of one-half of the rods composing the spokes, and to the faces of the inner disks of the hub are cast the rag-wheels M M. These driving-wheels operate on the short axles O O, connected to the arms B of the balanced frame in the center line of the vertical arms C, in which position they are held by the ordinary nut on the end of the axles, and both ends of the boxings of the hubs are rounded, so as to present as little end friction as possible against the nuts and inner shoulders of the axle.

The wheels are operated by flat-linked endless chains P, constructed so that the links can be removed for tightening up the chains and gearing and operate in the teeth of the fixed rag wheels or disks upon the inner ends of the hubs and the counterparts Q Q on the periphery of each clutch-box, and prevent slipping on receiving motion from or communicating motion to the driving-wheels. To the bar A is attached the coiled springs R, to which is bolted a suitable seat, S, for the rider.

By this construction and arrangement of the frame and operating mechanism it will be seen that the preponderance of the weight is below the axis of revolution, and the action upon the levers or treadles oblique to or forward of the axis of revolution, whereby the frame is always kept in a balanced position.

In practice the rider will be seated upon the seat at the top of the balanced frame, with hands grasping the handles of vertical levers, and with the feet operate the treadles in the usual way, which drives the machine forward with ease and rapidity; and in order to turn the machine completely around or steer it in either direction one of the clutches of the couplings is thrown out of gear by the lever-arm upon that side, when the machine can be directed to the right or left, or turned completely around in a very small space with only one wheel in gear.

Having thus described my invention, what I claim, and desire to secure by Letters Patent, is—

1. The combination, in a bicycle, of the iron frames A, bent to form the horizontal arms B, vertical arms C, and loop D, the projecting lugs E E, secured to the arms C, the cranked axle G, journaled in the lugs E E, the clutch-couplings F, clutch-boxes $F^x$, and counterpart boxes $F^2$ on said axle, the vertical hand-levers $G^x$ $G^x$, passing through the lugs E E and lugs H H on the frames A, the toes or lugs I, for connecting levers $G^x$ with the clutch-boxes, collars $J^x$, and springs J on the cranked axle to limit the movement of the clutch-boxes in one direction, and curved arms connected to lugs E for limiting the movement of the boxes in the other direction, all substantially as shown and described.

2. The combination of the driving-wheels L L, having rag-wheels M M secured thereto, the short axles o o, connected to the arms B, the iron frames A, bent to form the horizontal arms B, vertical arms C, and loop D, the projecting lugs E E, secured to the arms C, the cranked axle G, journaled in lugs E E, the clutch-couplings F, clutch-boxes $F^x$, and counterpart boxes $F^2$ on said axle, the rag-wheels Q Q on the periphery of each clutch-box, the chains P P, and the hand-levers $G^x$ $G^x$, connecting with the clutch-boxes for controlling the operation of the same, all substantially as described.

In testimony that I claim the foregoing I have hereunto set my hand and seal.

EMIL BLOSSFELD. [L. S.]

Witnesses:
C. W. M. SMITH,
CHAS. E. KELLY.